United States Patent
Kolligs et al.

(10) Patent No.: US 7,162,011 B2
(45) Date of Patent: Jan. 9, 2007

(54) METHOD AND DEVICE FOR MEASURING THE QUALITY OF A NETWORK FOR THE TRANSMISSION OF DIGITAL OR ANALOG SIGNALS

(75) Inventors: Detlef Kolligs, Dieburg (DE); Klaus Weingartz, Seeheim (DE)

(73) Assignee: Deutsche Telekom AG, Bonn (DE)

( * ) Notice: Subject to any disclaimer, the term of this patent is extended or adjusted under 35 U.S.C. 154(b) by 552 days.

(21) Appl. No.: 10/221,600

(22) PCT Filed: Apr. 5, 2001

(86) PCT No.: PCT/EP01/03865

§ 371 (c)(1),
(2), (4) Date: Sep. 12, 2002

(87) PCT Pub. No.: WO01/82574

PCT Pub. Date: Nov. 1, 2001

(65) Prior Publication Data

US 2003/0053601 A1 Mar. 20, 2003

(30) Foreign Application Priority Data

Apr. 20, 2000 (DE) .............................. 100 19 552

(51) Int. Cl.
*H04M 1/24* (2006.01)
*H04M 3/08* (2006.01)
*H04M 3/22* (2006.01)

(52) U.S. Cl. .................... 379/1.04; 379/1.01; 379/28; 379/29.09

(58) Field of Classification Search ............... 379/1.01, 379/1.02–1.04, 3, 15.03, 22.04, 22.08, 28, 379/29.08, 30, 23, 24, 29.01, 29.09
See application file for complete search history.

(56) References Cited

U.S. PATENT DOCUMENTS

| 4,565,966 | A | * | 1/1986 | Burr et al. |
| 4,870,675 | A | * | 9/1989 | Fuller et al. ............. 379/29.05 |
| 5,490,199 | A | * | 2/1996 | Fuller et al. ............... 379/1.04 |

(Continued)

FOREIGN PATENT DOCUMENTS

DE 1047832 12/1958

(Continued)

OTHER PUBLICATIONS

Ramsden "In-service, nonintrusive measurement on speech signals"; in "Proceedings of the global telecommunications conference", Dec. 2, 1991, pp. 1761-1764.

(Continued)

*Primary Examiner*—Quoc Tran
(74) *Attorney, Agent, or Firm*—Darby & Darby

(57) ABSTRACT

A method for measuring a quality of a line network using an in-service non-intrusive measurement device monitoring of live traffic measurement process includes determining reference values of parameters of the in-service non-intrusive measurement process for a connection over at least a part of the line network and storing the determined reference values in a memory so that the determined reference values are allocated to the part of the line network. The part of the line network is monitored using the in-service non-intrusive measurement process so as to generate measured values of the parameters of the in-service non-intrusive measurement process. The measured values are compared with the respective stored determined reference values so that correspondences with and divergences from the stored determined reference values are recognizable and capable of being evaluated with regard to a quality of transmission.

21 Claims, 3 Drawing Sheets

U.S. PATENT DOCUMENTS

| | | | | |
|---|---|---|---|---|
| 5,745,558 | A | * | 4/1998 | Richardson, Jr. et al. |
| 5,875,230 | A | | 2/1999 | Ganley et al. ............... 379/29 |
| 6,104,782 | A | | 8/2000 | Finfera ........................ 379/5 |
| 6,246,978 | B1 | * | 6/2001 | Hardy |
| 6,609,092 | B1 | * | 8/2003 | Ghitza et al. |
| 6,895,081 | B1 | * | 5/2005 | Schmidt et al. ............ 379/1.01 |
| 2004/0179515 | A1 | * | 9/2004 | Kamani et al. |

FOREIGN PATENT DOCUMENTS

| | | |
|---|---|---|
| DE | 19650836 | 7/1998 |
| EP | 0565224 | 10/1993 |
| EP | 0665625 | 7/1995 |
| EP | 0741471 | 11/1996 |

OTHER PUBLICATIONS

ITU-T Recommendation P.561: "Telephone Transmission Quality Objective Measuring Apparatus; In-Service, Non-Intrusive Measurement Device—Voice Service Measurements", International Telecommunication Union, Feb. 1996, pp. i-vi, 1-14, Appendix III.

ITU-T Recommendation G.107: "Series G: Transmission Systems and Media, Digital Systems and Networks; The E-Model, a Computational Model for Use in Transmission Planning" International Telecommunication Union, Dec. 1998, pp. i-iii, 1-17.

ETSI, Guide 201 050 V1.2.2: "Speech Processing, Transmission and Quality Aspects (STQ); Overall Transmission Plan Aspects for Telephony in a Private Network", Feb. 1999, pp. 3-6, 11, 21-24, 75-76, 81-82, 87-93.

"Quali.Net ™, Automated Intrusive Test Call System", ECTEL an ECI Telecom Company, TRP-360, Cat. No. 990620700.

ETSI Technical Report ETR 250,: "Transmission and Multiplexing™; Speech Communication Quality from Mouth to Ear 3,1 kHz Handset Telephony across Networks", ETSI TC-TM, DTR/TM-05006, ETSI, European Telecommunications Standards Institute, Jul. 1996, pp. 3-6, 11, 13, 22, 28, 88-94, 96-98, 125-129, 167.

ETSI Technical Report ETR 138: "Network Aspects (NA); Quality of service indicators for Open Network Provision (ONP) of voice telephony and Integrated Services Digital Network (ISDN)". DTR/NA-042134, ETSI, European Telecommunications Standards Institute, Dec. 1997, Second Edition, pp. 3-5, 9, 11, 27.

ITU-T Recommendation P.861: "Series P: Telephone Transmission Quality, Telephone Installations, Local Line Networks; Objective Quality Measurement of Telephone-band (300-3400 Hz) speech codecs", International Telecommunication Union, Feb. 1998, pp. ii-v, 1-33.

"QualiView ™, In-Service Non-Intrusive Measurement Device", ECTEL and ECI Telecon Company, TRP-360.

Net-C : "Global Communications Network Monitoring for high Efficiency, Quality of Service and Fraud Detection", ktronix.

* cited by examiner

METHOD AND DEVICE FOR MEASURING THE QUALITY OF A NETWORK FOR THE TRANSMISSION OF DIGITAL OR ANALOG SIGNALS

BACKGROUND

The present invention relates to a method of the type specified in the preamble of claim 1 and to a device of the type specified in claim 16 for measuring the quality of a network for the transmission of digital or analog signals, using an in-service non-intrusive measurement device monitoring of live traffic (INMD) measuring method.

Methods and devices for measuring the quality of a line network designed to transmit digital or analog signals, including the (terminal) connections which are used to connect telecommunication terminals such as telephones, fax machines, modems, mobile telephones or the like to the line network, are generally known.

Thus, for example, the INMD measurement method (in-service non-intrusive measurement device monitoring of live traffic) exists which works according to ITU-T standard P.561 and the further development thereof. Using this measurement method, parameters describing the quality of the transmission can be queried during operation, for example, during a telephone conversation. Possible parameters of the measurement method can includes the speech level, the noise level, the echo delay time, the active return loss or the like in the payload channel.

Moreover, it is also possible to acquire the information of the signaling channel such as the D-channel or the central signaling channel No. 7 (SS No. 7).

This measurement method has the advantage of permitting information on the change in individual parameters over a predetermined time in the line network without intervention in the line network, i.e., without disconnection of parts of the line network. In this manner, the INMD method can detect potential anomalies such as periodically occurring noise, echo problems at line terminating units, etc. from the environment of terminal devices and between the interfaces of network elements.

However, the values determined for the individual measuring parameters are meaningful only with respect to their change over time. For instance, the speech level changes during the duration of a telephone conversation or, at a specific instant of another measurement, the noise level was different from that of this measurement. It is then possible to draw conclusions from this and to take measures by which the causes of the changes in the measurement parameter and, thus, the quality limitation of the transmission are eliminated.

However, this known measurement method has the disadvantage that it is not possible to specifically isolate the error to the actual cause of the quality impairment of the transmission in the line network or to exactly locate the errors. Moreover, parameters are measured which are influenced by the telecommunication terminal as well. Therefore, the explanatory power with respect to the possible quality in the line network is insufficient.

Moreover, there is basically one measurement method which is known as "out of service, intrusive network" measurement method and works according to ITU-T standard P.861. In this case, both telecommunication terminals and elements of the line network have to be disconnected from the line network to determine transmission characteristics at selected points of the line network. Then, an RTU (remote test unit) is connected at the separation points such as connections or distributors. This RTU serves as a transmitter at one end and as a receiver at the other end. The RTU is a test device which simulates functions of terminal devices, i.e., the transmission of speech information, data, image information and the like. Using predetermined parameters, different physical quality considerations can be performed out of service in the network from the transmitter to the receiver which constitutes the measuring point. It is also conceivable to integrate the RTU functions as a remotely controllable module or chip into a terminal device (for example, use in a Multimedia Internet PC).

However, this measurement method has the disadvantage that the real situation during the transmission of analog or digital signals, for example, during telecommunication (live traffic) between a customer A and a customer B cannot be monitored. Consequently, neither influences of the telecommunication terminals on the line network nor repercussions from the line network to the telecommunication terminals can be detected immediately. Furthermore, the expenditure, in particular the personnel expenditure, for this measurement method is very high.

Also known is a network planning model, the so-called "E-model" according to ITU standard G.107, which permits calculation of the transmission quality.

SUMMARY OF THE INVENTION

An object of the present invention is to further develop a method for measuring the quality of a network for the transmission of digital or analog signals, using an INMD measuring method, and a device for carrying out this method in a manner that allows better measurement and evaluation of the quality of the transmission for a connection, or communication path, over a part of the line network and, consequently, of the performance of this part of the line network, including the influences of the telecommunication terminals connected at the customer end for the transmission of different services such as speech, facsimile, data and/or the like.

The present invention provides a method for measuring a quality of a line network using an in-service non-intrusive measurement device monitoring of live traffic measurement process. The method includes: determining reference values of parameters of the in-service non-intrusive measurement process for a connection over at least a part of the line network; storing the determined reference values in a memory so that the determined reference values are allocated to the at least a part of the line network; monitoring the at least a part of the line network using the in-service non-intrusive measurement process so as to generate measured values of the parameters of the in-service non-intrusive measurement process; and comparing the measured values with the respective stored determined reference values so that correspondences with and divergences from the stored determined reference values are recognizable and capable of being evaluated with regard to a quality of transmission.

The present invention is based on the discovery that by determining reference values for the parameters of the INMD measurement method and comparing the values that are measured with the INMD measurement method to the reference values, it is immediately possible to make clear statements about the quality of the telecommunications connection.

Therefore, according to the present invention, initially, reference values of the parameters of the INMD measurement method are determined for a connection over at least a part of the line network. These reference values are allocated to this part of the line network and stored in a memory. Subsequently, this part of the line network is monitored with the aid of the INMD measurement method, during which the values of the respective parameters that are measured in this process are compared with the stored allocated reference values so that correspondences with and divergences from the reference values (comparison values) are recognizable and able to be evaluated with regard to the quality of the transmission.

The values of the respective parameters measured with the INMD measurement method can now be immediately evaluated in a simple manner with regard to the quality of the transmission from customer A to customer B. In addition, this results in far-reaching possibilities of quality management. For example, parts of the line network that are monitored in accordance with the measurement method according to the present invention can be leased with minimum quality standards without any problem because quality impairments can be immediately eliminated without the customer having to complain with the network operator for this. This results in a considerable increase in customer satisfaction.

Furthermore, much more parts of a line network can be monitored with the measurement method according to the present invention than would be possible, for example, with the personnel-intensive out of service, intrusive network measurement method.

The reference values can be determined, for example, via an out of service, intrusive network measurement method or else be calculated, in particular, with the aid of a network planning model such as the E-model according to ITU standard G. 107. During measurement with the out of service, intrusive network measurement method, the corresponding parameters of the INMD measurement method are measured.

To document the quality of the monitored part of the line network, the values measured with the INMD measurement method and/or the allocated comparison values are stored in the memory in relation to this part of the line network. This also allows time-dependent consideration of the individual parameters with regard to the measured values and/or the comparison values in a simple manner. Therefore, the reference values, the measured values and/or the comparison values are associated, in particular, with a measuring time.

According to one specific embodiment of the present invention, threshold values are established for the individual parameters of the INMD measurement method, and these threshold values are continuously compared with the allocated measured values during the INMD measurement procedure. When a threshold value is exceeded, a signal is issued. In this manner, the monitoring can be considerably simplified since ultimately, it is only when a predetermined threshold value is exceeded that a parameter has changed in such a manner that measures are necessary to eliminate the impairment of the transmission quality. Depending on the transmission quality that has been guaranteed to the customer, the threshold values encompass a larger or smaller bandwidth.

In particular, the signal operates a visual and/or audible indicator which alerts a responsible person that the measures required to eliminate the impairment of the transmission quality must now be initiated.

To specifically detect and locate the possibly cause, in particular, in the case of an impairment of the transmission quality, the out of service, intrusive network measurement method is reinitiated when at least one threshold value of a parameter is exceeded by at least one single measured allocated value. In this manner, the personnel and cost-intensive out of service, intrusive network measurement method is only carried out when an impairment of the transmission quality has actually occurred.

Then, during the out of service, intrusive network measurement procedure, measurements, such as PSQM according to ITU standard, are carried out to locate sources of disturbance.

To be able to make quality statements also with regard to the performance of the entire line network or at least for several parts of the line network, the reference values, the measured values and/or the comparison values of different parts of the line network are compared with each other (line comparison values).

According to a specific embodiment of the present invention, the method is carried out for different sections of a connection over the corresponding part of the line network. In this manner, it is also possible to carry out section-specific quality evaluations in a simple manner.

To quickly arrive at statements on the quality of a connection, the measured values and/or the comparison values are associated with quality index values/quality ratings as, for example, to transmission rating factor R. In addition, the connection can be meaningfully portrayed to the customer or to the person responsible for the quality of the line network with regard to time and quality in a subsequent evaluation program. To this end, preferably the reference values, the measured values, the comparison values and/or the quality index values/quality ratings can be displayed via an output device.

According to a specific embodiment of the present invention, the line network is composed of access line networks and a trunk line network, each connection being linked to the trunk line network via an access line network. The method for measuring the quality of a line network designed to transmit digital or analog signals is therefore possible for both the access line networks and for the trunk line network.

To be able, above all, to completely monitor all the conversations of a customer, at least the access line network is monitored using the INMD measurement method.

Further advantages, features and possible uses of the present method for measuring the quality of a line network designed to transmit digital or analog signals and of a corresponding device for carrying out the method follow from the following description in conjunction with the exemplary embodiment shown in the drawing.

BRIEF DESCRIPTION OF THE DRAWINGS

In the following, the present invention will be explained in greater detail based on exemplary embodiments with reference to the drawings.

FIG. 1 schematically shows a line network 10 which is composed of access line networks 12 and a trunk line network 14.

DETAILED DESCRIPTION

Figure 1:
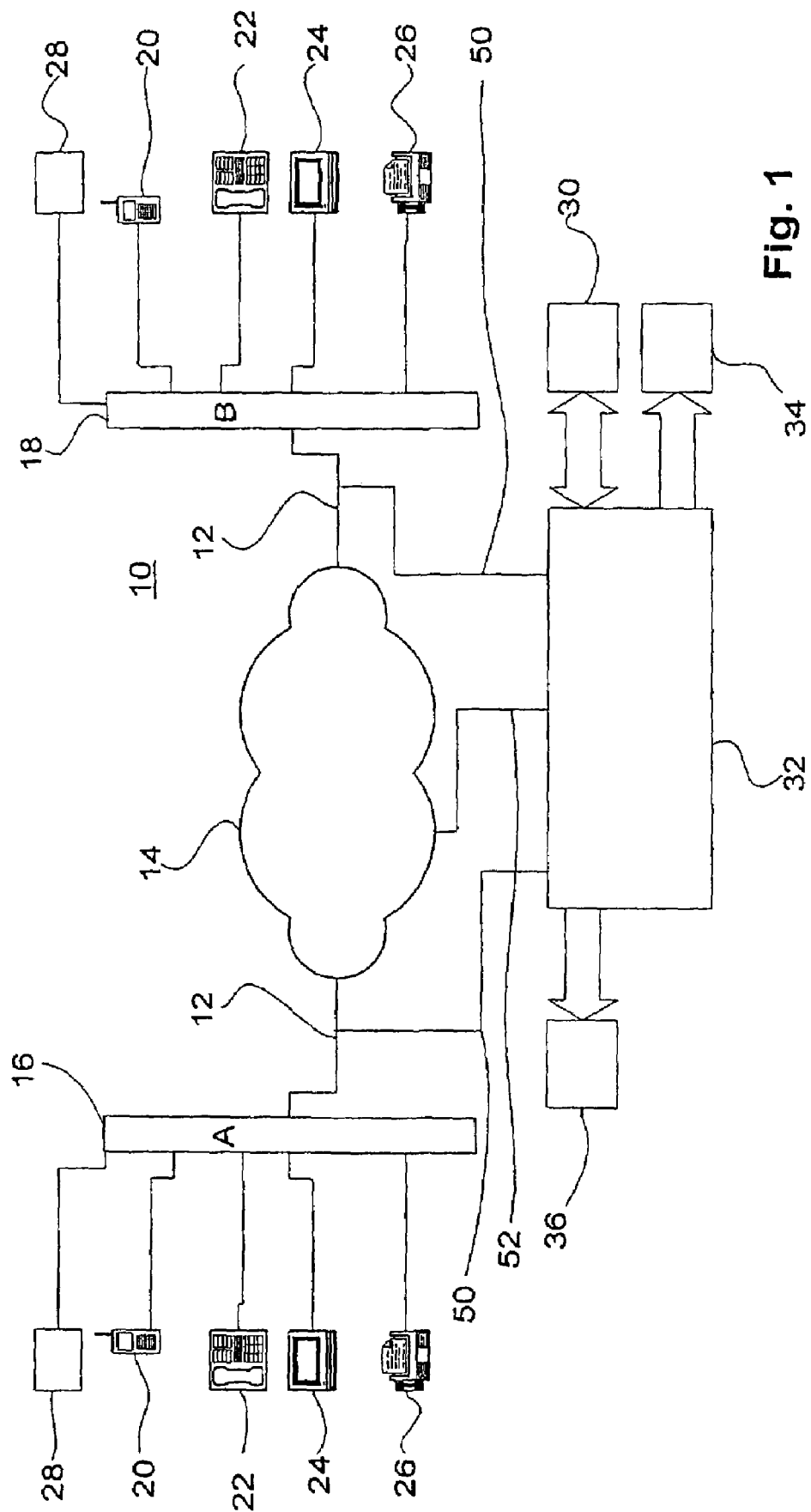
FIG. 1 is a schematic representation of a line network including connections for telecommunication terminals and devices for carrying out the measurement method according to the present invention.

Access line networks 12 connect trunk line network 14 to connections 16 and 18 of the customers. In this context, connection 16 is allocated to customer A and connection 18 is allocated to customer B.

Connected to each of connections 16 and 18 are a mobile telephone 20, a telephone 22, a PC 24, a fax machine 26 as well as a remote test unit 28, respectively. The remote test unit of customer A initially serves as a transmitter, remote test unit 28 of customer B is used as a receiver and thus as a measuring device.

To determine the quality of line network 10, different parameters such as the speech level, the noise level, the echo delay time, the active return loss or the like are measured in an out of service, intrusive network measurement method. In the process, the part of line network 10 from connection 16 to connection 18 is blocked for the other telecommunication terminals 20 through 26.

Remote test units 28 can also be connected at different sections of the connection from customer A to customer B to carry out a section-specific quality consideration. In the following, however, the arrangement shown in FIG. 1 will be used as a point of departure.

To ensure that usable results will indeed emerge in the process, the connection from customer A to customer B is carried over a single network channel. Otherwise, it would be required to carry out the following described method for all network channels that can be switched during the connection, the values then being allocated to the respective network channels.

The values of the mentioned parameters that are measured with the out of service, intrusive network measurement method are stored as reference values in a memory 30 of a measuring device 32, while allocating the connection, i.e., customer A to customer B, and the part of line network 10, i.e., connection 16, access line network 12, corresponding network channel of trunk line network 14 as well as access line network 12 and connection 18.

Now, remote test units 28 are deactivated. Telecommunication terminals 20 through 26 can then establish a connection again.

The connection is monitored by measuring device 32 using an INMD measurement method. In this connection, measuring device 32 connects to the here selected network channel between customer A and customer B via an interface connection 52 into trunk line network 14. Since all connections between customer A and customer B are via this network channel, it is possible to monitor the connections with regard to transmission quality using the INMD measurement method. In the process, the corresponding parameters are continuously measured and compared with the reference values stored in memory 30. The resulting correspondences and differences (comparison values) are associated with quality index values, as will be explained further below. These quality index values can be displayed via an output device 34 so that the responsible person is immediately informed of the quality situation of the trunk line from customer A to customer B.

The measured values and the comparison values as well as the quality index values are associated with the measuring time and also stored in memory 30 for a later time-related evaluation.

Also stored in memory 30 are threshold values for the individual parameters of the INMD measuring method. During the INMD measurement, these threshold values are continuously compared with the allocated measured values. When the threshold value is exceeded, a signal is issued which operates a visual and audible indicating device 36. In this manner, the person who is responsible for the quality of the connection from customer A to customer B immediately receives a message when the quality of the connection is permanently impaired. The threshold values are established in accordance with the quality requirements agreed with the customer.

When at least one threshold value of a parameter is exceeded by at least one single measured allocated value, the out of service, intrusive network measurement method is initiated to detect and, above all, to locate the causes for the exceeding of the threshold value. In the process, measurements such as a PSQM measurement according to ITU standard are then carried out to locate the source of disturbance.

Alternatively to the method mentioned above, the reference values can also be calculated. By using a network planning model such as the E-model according to ITU standard G.107, the transmission planning of transmission paths, which is currently only oriented quantity, is intended to be supplemented with the possibility of a quality prediction. This computer-aided model calculation can be used, for example, to supply the network planner with information on the end-to-end transmission quality the customer may expect when using suitable transmission products. The results can be used, for example, in the development of contracts, in the providing process, and as a reference for the distribution process, for example, initial operation, measurement, maintenance, etc.

The now possible quality measurements require the transmission path, i.e., the payload channel required for the customer, to be established in such a manner that the transmission paths are not interconnected at random and other transmission devices are not planned for and connected at short notice. Rather, the customer gets predefined payload channels in line network 10 which are monitored in accordance with the method described above. In this manner, it is possible to make comprehensible quality statements.

To be able to monitor all the conversations of customer A or customer B, measuring device 32 is connected to access line network 12 via an interface connection 50. Via the signaling channel, measuring device 32 receives all the information it needs to be able to allocate the conversations.

Figure 2:
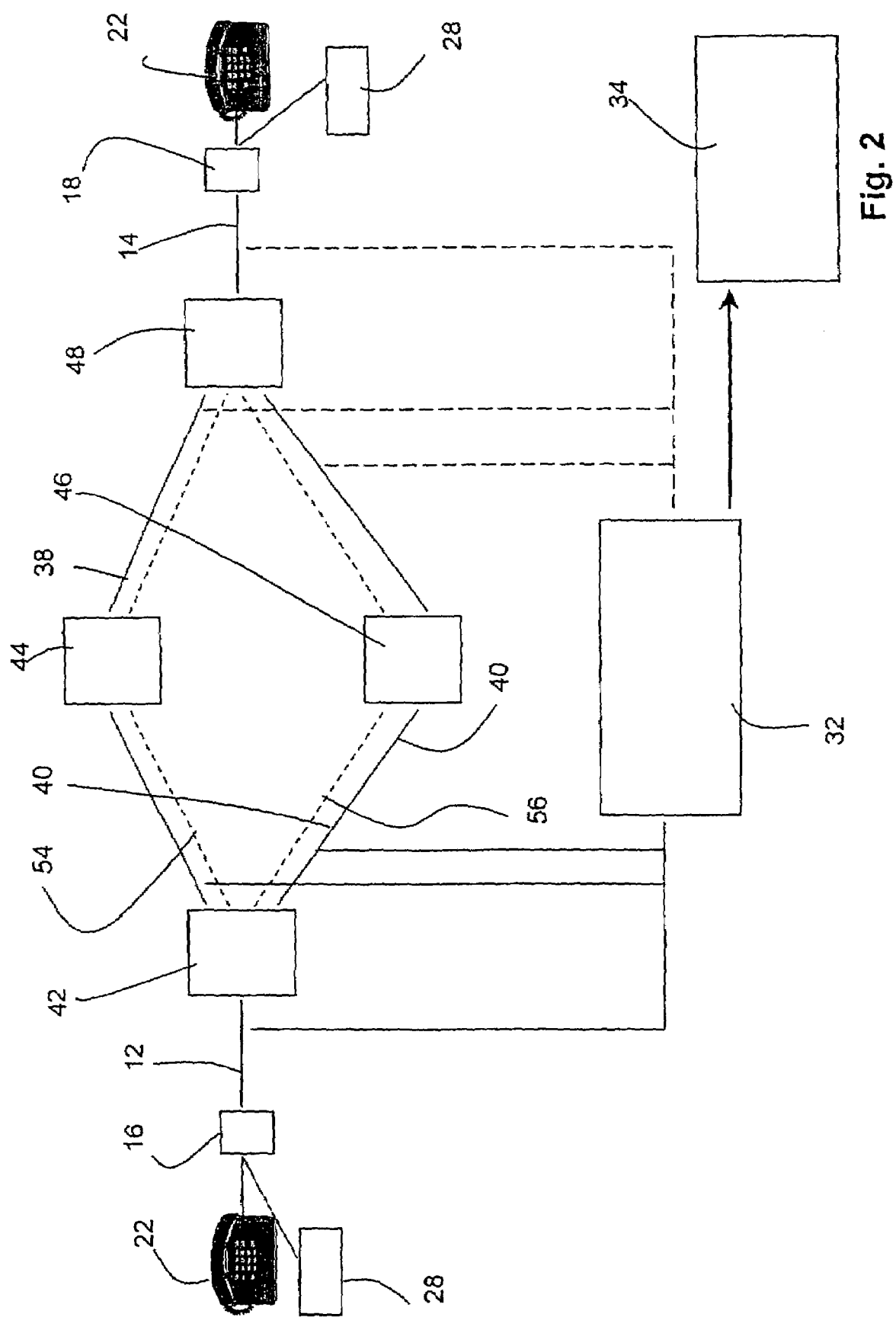
FIG. 2 is a schematic representation of the line network featuring two connection possibilities from customer A to customer B and the devices for carrying out the measurement method according to the present invention.

Correspondingly, FIG. 2 depicts a line network 10 which shows two payload channels 38 and 40 featuring four nodes 42 to 48.

In this context, measuring device 32 is connected to both payload channels 38 and 40 and to access line network 12 toward customer A. All connections from customer A to customer B can be via payload channel 38 or via payload channel 40, the information on the connection being taken by measuring device 32 from signaling channel 54 or 56, respectively. Consequently, the entire telecommunication between customer A and customer B is monitored with regard to the quality of the transmission in the manner described above.

The values measured in the process are compared with the reference values. The correspondences and differences result in comparison values which are associated with quality index values. For example, if the transmission rating factor is smaller than 23%, the transmission is useless. In the case of a transmission rating factor from 24% to 43%, the transmission is bad; in the case of a transmission rating factor from 44% to 63%, the transmission is average; in the case of a transmission rating factor from 64% to 94%, the transmission is good; and in the case of a transmission rating factor of 95% or more, the transmission is excellent.

Figure 3:
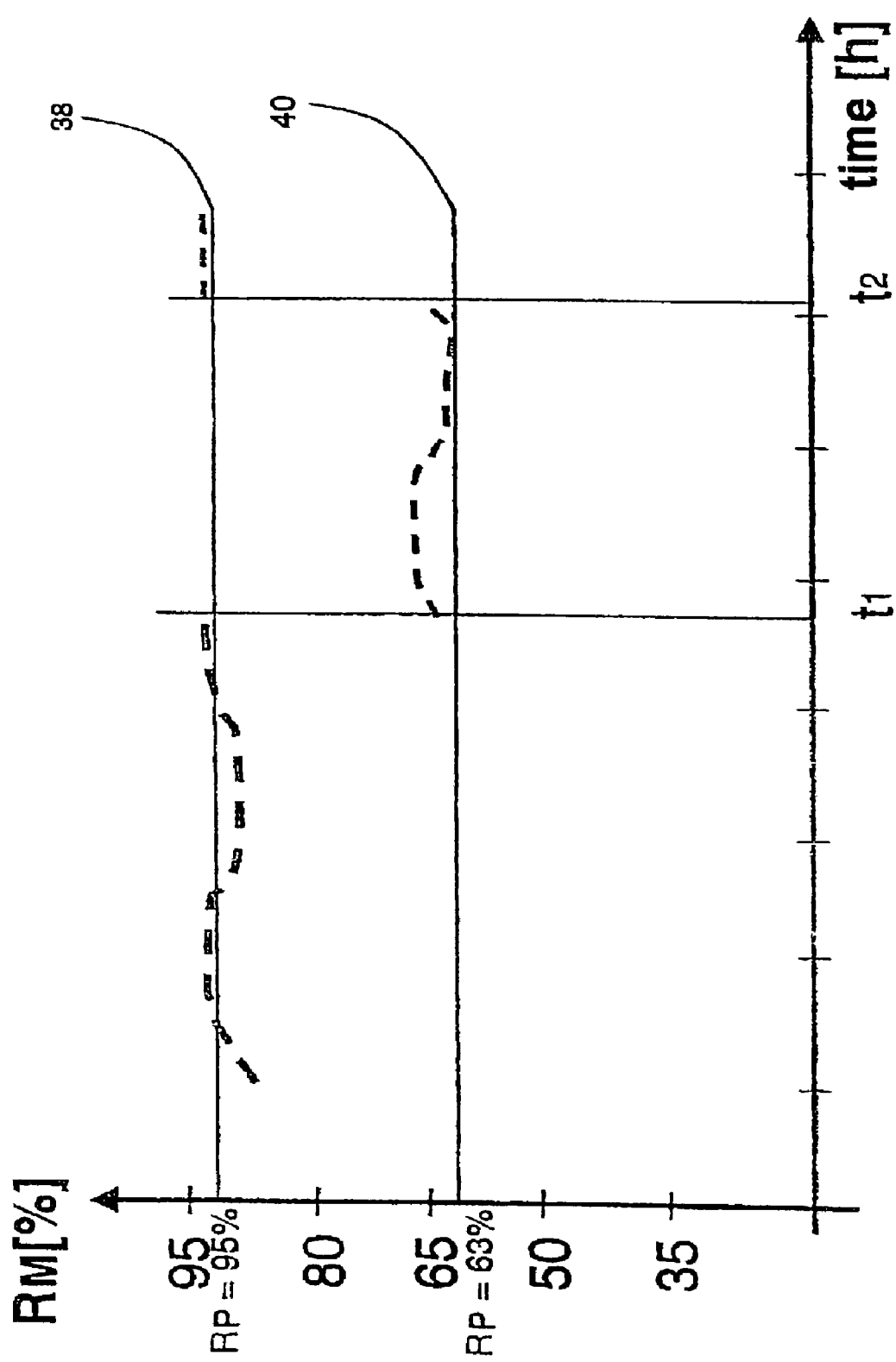
FIG. 3 shows a diagram depicting the quality levels of the two connection possibilities over time.

FIG. 3 shows the transmission rating factor of the two payload channels 38 and 40 distributed over time. It follows from this, that from a certain instant t1 onwards, only second payload channel 40 is used for the connection from customer A to customer B and not first payload channel 38. Outside the time t2–t1, only first payload channel 38 is used. First payload channel 38 has an excellent transmission quality whereas the quality of second payload channel 40 is average. The percentage numbers refer to the reference value.

Quality considerations of that kind are extremely important for pricing.

According to the case depicted in FIG. 3, for example, the customer could have agreed a good transmission quality except for the time t2–t1. During the time from t1 to t2, however, the connection intensity would only be very low so that he/she is satisfied with an average quality. Therefore, he/she requires the network operator to guarantee a high quality for the first period of time and an average quality for the second period of time. In this manner, it is easily possible to prepare a price offer matching the customer's demand profile.

What is claimed is:

1. A method for measuring a quality of a line network using an in-service non-intrusive measurement device monitoring live traffic measurement process, the method comprising:

determining, using an out-of-service intrusive measurement process, reference values of parameters of the in-service non-intrusive measurement process for a connection over at least a part of the line network;

storing the determined reference values in a memory so that the determined reference values are allocated to the at least a part of the line network;

monitoring the at least a part of the line network using the in-service non-intrusive measurement process so as to generate measured values of the parameters of the in-service non-intrusive measurement process; and comparing the measured values with the respective stored determined reference values so that correspondences with and divergences from the stored determined reference values are recognizable and capable of being evaluated with regard to a quality of transmission.

2. The method as recited in claim 1 wherein the line network is configured to transmit digital or analog signals and includes terminal connections linked thereto and configured to connect telecommunication terminals to the line network, the telecommunications terminals including at least one of a telephone, a fax machine, a modem, and a mobile telephone.

3. The method as recited in claim 1 wherein the determining reference values is performed by calculation.

4. The method as recited in claim 3 wherein the calculation includes using a network planning model.

5. The method as recited in claim 4 wherein the network planning model includes an E-model according to an ITU standard.

6. The method as recited in claim 1 further comprising storing the measured values in the memory so that the measured values are allocated to the at least a part of the line network.

7. The method as recited in claim 6 further comprising associating at least one of the determined reference values and the measured values with a measuring time.

8. The method as recited in claim 1 further comprising:

establishing respective threshold values for the parameters of the in-service non-intrusive measurement process;

continuously comparing the established threshold values with the measured values; and triggering a signal when a threshold value is exceeded.

9. The method as recited in claim 8 wherein the continuously comparing is performed during the monitoring.

10. The method as recited in claim 8 wherein the signal includes at least one of a visual and an audible indicator.

11. The method as recited in claim 8 further comprising initiating the out-of-service intrusive network measurement process when at least one threshold value of a parameter is exceeded by the respective at least one measured value so as to detect and to locate a cause for the exceeding of the threshold value.

12. The method as recited in claim 11 wherein the out-of-service, intrusive network measurement process includes measurements to locate a sources of a disturbance.

13. The method as recited in claim 12 wherein the measurements include a PSQM measurement according to an ITU standard.

14. The method as recited in claim 1 wherein the at least a part of the line network includes a first and a second part of the line network and further comprising comparing the reference values for the first part of the line network with the reference values for the second part of the line network.

15. The method as recited in claim 1 wherein the at least a part of the line network includes a first and a second part of the line network and further comprising comparing the measured values for the first part of the line network with the measured values for the second part of the line network.

16. The method as recited in claim 1 wherein the at least a part of the line network includes a plurality of parts of the line network included in a connection.

17. The method as recited in claim 1 further comprising associating at least one of the reference values and the measured values with quality index values or ratings.

18. The method as recited in claim 17 further comprising displaying at least one of the reference values, the measured values, and the quality index values or ratings using an output device.

19. The method as recited in claim 2 wherein the line network includes an access line networks and a trunk line network, each of the terminal connections being linked to the trunk line network via a respective access line network.

20. The method as recited in claim 19 wherein the at least part of the line network includes the access line network.

21. A device for measuring a quality of a line network using an in-service non-intrusive measurement device monitoring of live traffic measurement process, the device comprising:

a test device configured to determine, using an out-of-service intrusive measurement process, reference values of parameters of the in-service non-intrusive measurement process for a connection over at least a part of the line network;

a memory configured to store the determined reference values so that the determined reference values are allocated to the at least a part of the line network;

a measuring device configured to monitor the at least a part of the line network using the in-service non-intrusive measurement process so as to generate measured values of the parameters of the in-service non-intrusive measurement process; and a comparison device configured to compare the measured values with the respective stored determined reference values so that correspondences with and divergences from the stored determined reference values are recognizable and capable of being evaluated with regard to a quality of transmission.

* * * * *